(12) United States Patent
Kuroda

(10) Patent No.: US 7,750,896 B2
(45) Date of Patent: Jul. 6, 2010

(54) DISPLAY DEVICE HAVING INTERMEDIATE FILMS PAIRED WITH LIGHT EMITTING ELEMENTS FOR DISPLAYING A LOCATION SPECIFIED BY A USER WITH A POINTER

(75) Inventor: Kazuo Kuroda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/917,807

(22) PCT Filed: Jun. 12, 2006

(86) PCT No.: PCT/JP2006/311751

§ 371 (c)(1),
(2), (4) Date: Dec. 17, 2007

(87) PCT Pub. No.: WO2006/134869

PCT Pub. Date: Dec. 21, 2006

(65) Prior Publication Data

US 2009/0230872 A1    Sep. 17, 2009

(30) Foreign Application Priority Data

Jun. 15, 2005   (JP)   ............... 2005-174963

(51) Int. Cl.
G09G 3/22 (2006.01)
(52) U.S. Cl. ..................................... 345/183; 345/207
(58) Field of Classification Search ................. 345/156, 345/179, 182, 183, 204, 207, 690, 697
See application file for complete search history.

(56) References Cited

U.S. PATENT DOCUMENTS

| 6,747,290 B2 | 6/2004 | Yamazaki et al. | |
| 6,972,753 B1 * | 12/2005 | Kimura et al. | 345/175 |
| 2006/0066537 A1 * | 3/2006 | Kimura et al. | 345/76 |

FOREIGN PATENT DOCUMENTS

| JP | 5-150901 | 6/1993 |
| JP | 2002-259053 A | 9/2002 |
| JP | 2002-287900 A | 10/2002 |
| JP | 2004-79428 A | 3/2004 |
| JP | 2004-318819 A | 11/2004 |

* cited by examiner

Primary Examiner—Thuy Vinh Tran
(74) Attorney, Agent, or Firm—Young & Thompson

(57) ABSTRACT

The display apparatus (1) is provided with: a plurality of intermediate films (120), each of which reflects light including at least a corresponding light component with a predetermined wavelength from among incoming light; and a plurality of light receiving elements (130), each of which receives the incoming light through the intermediate films.

16 Claims, 14 Drawing Sheets

FIG. 8
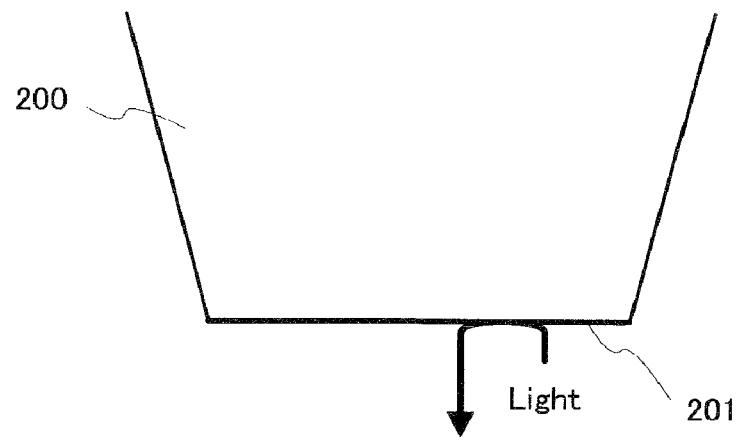
(a)
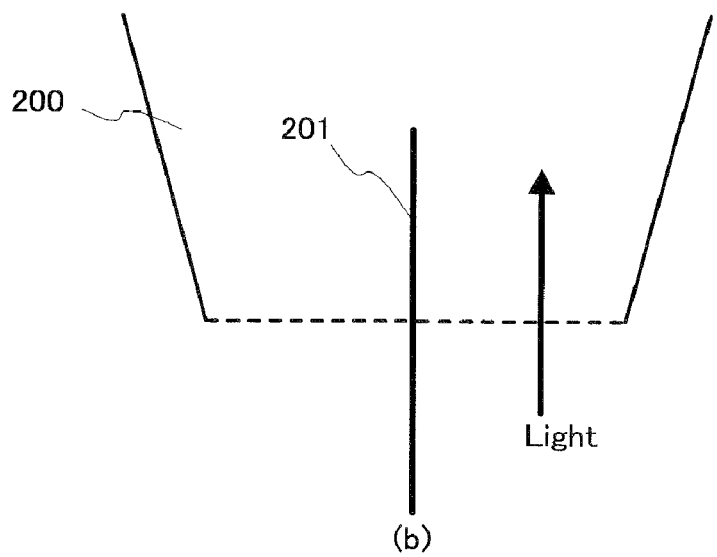
(b)
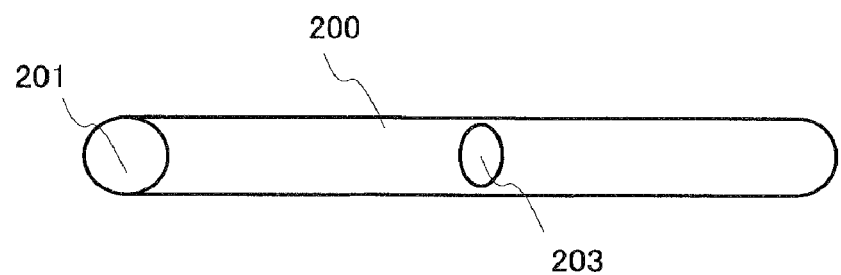
(c)

DISPLAY DEVICE HAVING INTERMEDIATE FILMS PAIRED WITH LIGHT EMITTING ELEMENTS FOR DISPLAYING A LOCATION SPECIFIED BY A USER WITH A POINTER

This Application is a national Phase application filed under 35 U.S.C. 371, claiming the benefit of an international application PCT/JP2006/311751 filed on Jun. 12, 2006 which has a priority benefit from a foreign application JP-2005-174963 filed on Jun. 15, 2005.

TECHNICAL FIELD

The present invention relates to equipment for displaying a location specified by a user with a pointer or the like on a display surface, and particularly relates to a display apparatus, such as a display, including the equipment.

BACKGROUND ART

For example, there has been developed a technology of displaying a portion traced by a presenter or the like on a display surface of a display apparatus, such as a liquid crystal display and a plasma display, in a special aspect which can distinguish the portion from another video image on the display surface. For example, as shown in a patent document 1, there has been developed a technology in which an infrared sensor or the like is embedded in advance in the display surface and the presenter traces the display surface with a special pen, which irradiates infrared light, to thereby display a portion pointed by the presenter or the like with a predetermined marker on the display surface on the basis of the detection result of the infrared light by the infrared sensor. Alternatively, the same construction can be employed by using e.g. ultrasound or the like, instead of the infrared light. Moreover, for example, there has been also developed a technology in which a touch panel is displaced in the front of the display surface and a portion touched by the presenter is correspondingly displayed with a predetermined marker on the display surface.

Patent document 1: Japanese Patent Application Laid Open NO. Hei 3-316770

DISCLOSURE OF INVENTION

Subject to be Solved by the Invention

As described above, the aforementioned technologies use the infrared light, the ultrasound, or the like, or use the touch panel.

The aforementioned problems are exemplified as one example of the subject to be solved by the present invention. It is therefore an object of the present invention to provide a display apparatus which can display a desired portion on the display surface pointed by a user or the like, with a marker or the like in a new aspect.

Means for Solving the Object

The above object of the present invention can be achieved by a first display apparatus provided with: a plurality of intermediate films, each of which reflects light including at least a corresponding light component with a predetermined wavelength from among incoming light; and a plurality of light receiving elements, each of which receives the incoming light through the intermediate films.

According to the first display apparatus of the present invention, the light enters the light receiving element from the exterior through a semi-transmissive film. The intermediate film selectively reflects the light component with the predetermined wavelength. On the other hand, the intermediate film selectively transmits a light component with a wavelength other than the predetermined wavelength. The "intermediate film" herein is not necessarily limited to a film which reflects 100% of the light component with the predetermined wavelength, and it only needs to be able to reflect the light component with the predetermined wavelength to the extent that it can be a reflective film for the light component with the predetermined wavelength (e.g. it can reflect about 50% or more of the light component with the predetermined wavelength). In addition, the "intermediate film" is not necessarily limited to a film which transmits 100% of the light component with the wavelength other than the predetermined wavelength, and it only needs to be able to transmit the light component with the predetermined wavelength to the extent that it can be a permeable film for the light component with the predetermined wavelength (e.g. it can transmit about 50% or more of the light component with the predetermined wavelength). This can be also derived from the fact that it is realistically hard to produce a film which reflects 100% of the light component with the predetermined wavelength and which transmits 100% of the light component with the other wavelength.

By this, a user traces or points the surface of the display apparatus (e.g. a light incident surface or the like when it is observed from the light receiving element) with a pointer or the like which can irradiate light or the like, and then the received light amount of the light receiving element in the portion traced or pointed by the user is increased. Thus, by monitoring the received light amount of the light receiving element, it is possible to recognize which portion the user traces or points. As a result, it is possible to display the portion traced or pointed by the user, with a marker or the like in a predetermined shape, on a display device, such as a display monitor provided in the inside or exterior of the display apparatus. By this, the user can point the desired portion on the display device in association with a video image or the like displayed on the display device. Alternatively, the user can draw a desired character, a figure or the like in a desired shape, and the like, on the display device.

In particular, the light enters the light receiving element through the intermediate film which selectively reflects the light component with the predetermined wavelength. In other words, the light component with the wavelength other than the predetermined wavelength selectively enters the light receiving element. Thus, the display apparatus can recognize even the color or the like of the light which enters the light receiving element. Therefore, in accordance with color of light which is used by the user to trace or point the surface of the display apparatus, the marker or the like with the corresponding color can be displayed on the display device.

In one aspect of the first display apparatus of the present invention, the light receiving element includes an organic light receiving element.

According to this aspect, the light receiving element in a thin film shape can be formed by a printing method (e.g. an inkjet method or the like). By this, it is possible to thin the display apparatus.

In another aspect of the first display apparatus of the present invention, it is further provided with a plurality of light emitting elements which emit light, the plurality of intermediate films being disposed between the plurality of light emitting elements and the plurality of light receiving elements.

According to this aspect, the light emitted from the light emitting element is reflected by e.g. a pen-shaped pointer owned by the user, and then it enters the light receiving element through the light emitting element. That is, the user traces or points the surface of the display apparatus (e.g. a display surface or the like) with the pointer or the like, and then the received light amount of the light receiving element in the portion traced or pointed by the user is increased. Thus, by monitoring the received light amount of the light receiving element, it is possible to recognize which portion the user traces or points. As a result, it is possible to display the portion traced or pointed by the user, with the marker or the like in the predetermined shape, by using the plurality of light emitting elements provided for the display apparatus. By this, the user can point the desired portion on the display device in association with a video image or the like displayed by the plurality of light emitting elements which emit the light. Alternatively, the user can draw a desired character, a figure or the like in a desired shape, and the like, on the display device.

Moreover, the light emitting element is disposed on the side closer to the display surface than the light receiving element. Thus, it is possible to efficiently propagate the light toward the user and the pointer or the like owned by the user without significantly reducing the intensity of the light emitted from the light emitting element. In addition, since the light emitted from the light emitting element is reflected on the reflective film, which is disposed on the opposite side of the display surface, it is possible to propagate the light toward the user and the pointer or the like owned by the user, more efficiently.

In an aspect of the first display apparatus provided with each of the light emitting elements and the intermediate films, as described above, each of the plurality of intermediate films may be disposed to make a pair with respective one of the plurality of light emitting elements and reflects light emitted from the paired light emitting element. In addition, in an aspect of the first display apparatus provided with each of the light emitting elements and the intermediate films, as described above, each of the plurality of intermediate films may be disposed to make a pair with respective one of the plurality of light emitting elements and transmits a light component with a wavelength other than a wavelength of the light emitted from the paired light emitting element.

By virtue of such construction, the light emitted from the light emitting element can be preferably reflected by the intermediate film which is disposed to make a pair with the light emitting element. Therefore, as a result of the reflection by the intermediate film, it is possible to efficiently propagate the light emitted from the light emitting element toward the user and the pointer or the like owned by the user. By this, it is possible to improve the use efficiency of the light emitted from the light emitting element.

Moreover, the light component with the wavelength other than the wavelength of the light emitted from the light emitting element selectively enters the light receiving element. Thus, it is possible to efficiently propagate the light emitted from the light emitting element, toward the user and the pointer or the like owned by the user. At the same time, it is possible to preferably receive the light reflected by the pointer or the like owned by the user (or the light emitted from the pointer or the like owned by the user), on the light receiving element. In addition, the display apparatus can recognize the color or the like of the light which enters the light receiving element. Therefore, in accordance with color of light which is used (or which color of light is reflected) for the user to trace or point the display surface, the marker or the like with the corresponding color of can be displayed by using the plurality of light emitting elements.

In an aspect of the first display apparatus provided with each of the light emitting elements and the intermediate films, as described above, one of the plurality of light emitting elements, one of the plurality of light receiving elements which makes a pair with the one light emitting element, and one of the plurality of intermediate films which makes a pair with the one light emitting element may be laminated along an optical path of the incoming light.

By virtue of such construction, it is possible to receive the aforementioned benefits while making a group of the light emitting element, the light receiving element and the intermediate film.

In an aspect of the first display apparatus provided with the light emitting elements, as described above, one of the plurality of light emitting elements may be disposed at a different position from that of one of the plurality of light receiving elements corresponding to the one light emitting element, along with an optical path of the incoming light.

By virtue of such construction, the one light emitting element has a portion which does not overlap the one light receiving element along with the optical path of the incoming light. Alternatively, the one light emitting element does not overlap the one light receiving element, along with the optical path of the incoming light. That is, the one light emitting element and the one light receiving element are disposed at positions which are shifted from each other on the basis of the optical path of the incoming light.

In this construction, further, a reflective film which reflects about 100% of incoming light may be formed in the surroundings of the one light emitting element.

By virtue of such construction, it is possible to efficiently propagate the light emitted from the light emitting element toward the user and the pointer or the like owned by the user. By this, it is possible to improve the use efficiency of the light emitted from the light emitting element. Moreover, even if the reflective film which reflects about 100% of the incoming light is formed, since the light emitting element and the light receiving element are shifted from each other along with the optical path of the light, the light preferably enters the light receiving element. Therefore, it is also possible to use the reflective film as an optical path which leads the light to the light receiving element.

In an aspect of the first display apparatus provided with the light emitting elements, as described above, each of the plurality of light receiving elements may correspond to the plurality of light emitting elements in a ratio of 1:L (L is an integer of 1 or more).

By virtue of such construction, since the one light receiving element can correspond to the plurality of light emitting elements, it is possible to reduce the number of the light receiving elements.

In an aspect of the first display apparatus provided with the light emitting elements, as described above, the light emitting elements may include organic EL (Electro Luminescence) elements. Alternatively, the light emitting elements may include inorganic EL elements.

By virtue of such construction, the light emitting element in a thin film shape can be formed by a printing method (e.g. an inkjet method or the like). By this, it is possible to thin the display apparatus.

In an aspect of the first display apparatus provided with the light emitting elements, as described above, it may be further provided with a pointer provided with a reflective film which reflects light emitted from at least one of the plurality of light emitting elements, at a position away from each of the light emitting elements and the light receiving elements.

By virtue of such construction, by tracing or pointing the display surface of the display apparatus with the pointer, the light emitted from the light emitting element is reflected by the reflective film provided for the pointer. This increases the received light amount of the light receiving element in the portion traced or pointed by the user with the pointer. Therefore, it is possible to recognize which portion the user traces or points, so that it is possible to display the portion traced or pointed by the user, with the marker or the like in the predetermined shape.

In an aspect of the first display apparatus provided with the pointer, as described above, the reflective film selectively may reflect a light component with a predetermined wavelength from among the light emitted from at least one of the plurality of light emitting elements.

By virtue of such construction, it is possible to select the light reflected on the reflective film of the pointer. Therefore, the user can selectively reflect the light component with the desired wavelength by using the pointer, and the light receiving element can selectively receive the reflected light with the desired wavelength.

In an aspect of the first display apparatus provided with the pointer equipped with the reflective film which selectively reflects the light component with the predetermined wavelength, as described above, a semi-transmissive film, which selectively transmits a light component with a predetermined wavelength from among the light emitted from at least one of the plurality of light emitting elements, may be formed on the reflective film.

By virtue of such construction, the light component with the predetermined wavelength is selectively transmitted and the light component with the wavelength other than the predetermined wavelength is attenuated, scattered, or absorbed on the semi-transmissive film. Thus, the light component with the predetermined wavelength is selectively reflected on the reflective film.

In an aspect of the first display apparatus provided with the pointer, as described above, the pointer can switch between a first state and a second state, the light emitted from at least one of the plurality of light emitting elements being reflected to the light receiving element in the first state, the light emitted from at least one of the plurality of light emitting elements being not reflected to the light receiving element in the second state, and the display apparatus may be further provided with a switching device for switching between the first state and the second state.

By virtue of such construction, the pointer can reflect or not reflect the light emitted from the light emitting element by switching between the first state and the second state on the basis of the user's instruction or the like. Then, by switching between the first state and the second state, it is possible to select buttons displayed on the display surface, or perform similar actions, as described later.

In an aspect of the first display apparatus provided with the pointer, as described above, the pointer can switch between the first state and the second state by changing an angle of a reflective surface of the reflective film with respect to the pointer.

By virtue of such construction, it is possible to switch between the first state and the second state described above, relatively easily, by changing the angle of the reflective film, mechanically, electrically, or magnetically.

In an aspect of the first display apparatus provided with the light emitting elements, as described above, it is further provided with: a monitoring device for monitoring a received light amount of each of the plurality of light receiving elements; a judging device for judging whether or not the received light amount of at least one of the plurality of light receiving elements is equal to or greater than a predetermined threshold value; and a controlling device for controlling each of the plurality of light emitting elements to emit light from at least one of the plurality of light emitting elements, which corresponds to the at least one light receiving element in a ratio of 1:M (M is an integer of 1 or more), if it is judged that the received light amount of the at least one light receiving element exceeds the threshold value.

By virtue of such construction, the received light amount of the plurality of light receiving elements is monitored by the operation of the monitoring device. At this time, it is judged whether or not the received light amount of at least one of the plurality of light receiving elements is equal to or greater than the predetermined threshold value, by the operation of the judging device. In other words, the light receiving element whose received light amount exceeds the threshold value is selected by the operation of the judging device. Then, the plurality of light emitting elements are controlled by the operation of the controlling device to emit the light from the light emitting element corresponding to the light receiving element whose received light amount exceeds the threshold value. By this, it is possible to preferably recognize the portion traced or pointed by the user with the pointer or the like. At the same time, it is possible to display the portion with the marker or the like in the predetermined shape.

The first display apparatus is further provided with: a monitoring device for monitoring a received light amount of each of the plurality of light receiving elements; a judging device for judging whether or not the received light amount of at least one of the plurality of light receiving elements is equal to or greater than a predetermined threshold value; and a controlling device for controlling a light emitting device which is disposed in the exterior of said display apparatus and which comprises a plurality of light emitting elements for emitting light to emit light from at least one of the plurality of light emitting elements, which corresponds to the at least one light receiving element in a ratio of 1:N (N is an integer of 1 or more), if it is judged that the received light amount of the at least one light receiving element exceeds the threshold value.

According to this aspect, the received light amount of the plurality of light receiving elements is monitored by the operation of the monitoring device, and it is judged whether or not the received light amount of at least one of the plurality of light receiving elements is equal to or greater than the predetermined threshold value, by the operation of the judging device. Then, the plurality of light emitting elements are controlled by the operation of the controlling device to emit the light from the light emitting element corresponding to the light receiving element whose received light amount exceeds the threshold value, out of the plurality of light emitting elements provided for the light emitting device, such as an external display. By this, it is possible to preferably recognize the portion traced or pointed by the user with the pointer or the like. At the same time, it is possible to display the portion with the marker or the like in the predetermined shape.

The above object of the present invention can be achieved by a second display apparatus provided with: a plurality of light emitting elements, each of which emits light; and a plurality of light receiving elements, each of which receives incoming light through the light emitting layer, one of the plurality of light emitting elements being disposed at a different position from a position of one of the plurality of light receiving elements corresponding to the one light emitting element, along with an optical path of the incoming light.

According to the second display apparatus of the present invention, the light emitted from the light emitting element is reflected by e.g. a pen-shaped pointer owned by the user, and then it enters the light receiving element through the light emitting element. That is, the user traces or points the surface of the display apparatus (e.g. the display surface or the like) with the pointer or the like, and then the received light amount of the light receiving element in the portion traced or pointed by the user is increased. Thus, by monitoring the received light amount of the light receiving element, it is possible to recognize which portion the user traces or points. As a result, it is possible to display the portion traced or pointed by the user, with the marker or the like in the predetermined shape, by using the plurality of light emitting elements provided for the display apparatus. By this, the user can point the desired portion on the display device in association with a video image or the like displayed by the plurality of light emitting elements emitting the light. Alternatively, the user can draw a desired character, a figure or the like in a desired shape, and the like, on the display device.

In particular, on the second display apparatus, the one light emitting element has a portion which does not overlap the one light receiving element, along with the optical path of the incoming light. Alternatively, the one light emitting element does not overlap the one light receiving element, along with the optical path of the incoming light. That is, the one light emitting element and the one light receiving element are disposed at positions which are shifted from each other along with the optical path of the incoming light. Therefore, since the light can enter the light receiving element through a gap or the like between the light emitting elements, even if the aforementioned intermediate film is not provided, the user can point the desired portion on the display surface in association with a video image or the like displayed by the plurality of light emitting elements emitting the light.

Incidentally, in response to the various aspects of the first display apparatus of the present invention described above, the second display apparatus of the present invention can also employ various aspects.

In one aspect of the second display apparatus of the present invention, it is further provided with a plurality of intermediate films which are disposed between the plurality of light emitting elements and the plurality of light receiving elements and each of which reflects light a light component with a predetermined wavelength from among the incoming light.

According to this aspect, the light emitted from the light emitting element can be reflected by the intermediate film. Therefore, as a result of the reflection by the intermediate film, it is possible to efficiently propagate the light emitted from the light emitting element, toward the user and the pointer or the like owned by the user. By this, it is possible to improve the use efficiency of the light emitted from the light emitting element.

In addition, since the light enters the light receiving element through the intermediate film which selectively reflects the light component with the predetermined wavelength, the display apparatus can recognize even the color or the like of the light which enters the light receiving element. Therefore, as in the first display apparatus, in accordance with which color of light is used (or which color of light is reflected) for the user to trace or point the surface of the display apparatus, the corresponding color of marker or the like can be displayed on the display device.

These effects and other advantages of the present invention will become more apparent from the following embodiments.

As explained above, according to the first display apparatus of the present invention, it is provided with the light receiving elements and the intermediate films. Moreover, according to the second display apparatus of the present invention, it is provided with the light emitting elements and the light receiving elements, and one light emitting element is disposed at a different position from that of one light receiving element corresponding to the one light emitting element along with the optical path of the incoming light. Therefore, it is possible to display the desired portion on the display surface pointed by the user, with the marker or the like.

BRIEF DESCRIPTION OF DRAWINGS

FIG. 8 are cross sectional views generally showing more specific other structures of the pointer used in the display system in the embodiment.

DESCRIPTION OF REFERENCE CODES 1 display system
100 display
110R, 110G, 110B light emitting element
120R, 120G, 120B wavelength dependency semi-transmissive film
130R, 130G, 130B light receiving element
200 pointer
201 reflective film

BEST MODE FOR CARRYING OUT THE INVENTION

Hereinafter, the best mode for carrying out the present invention will be explained in each embodiment in order with reference to the drawings.

(1) Basic Structure

Figure 1:
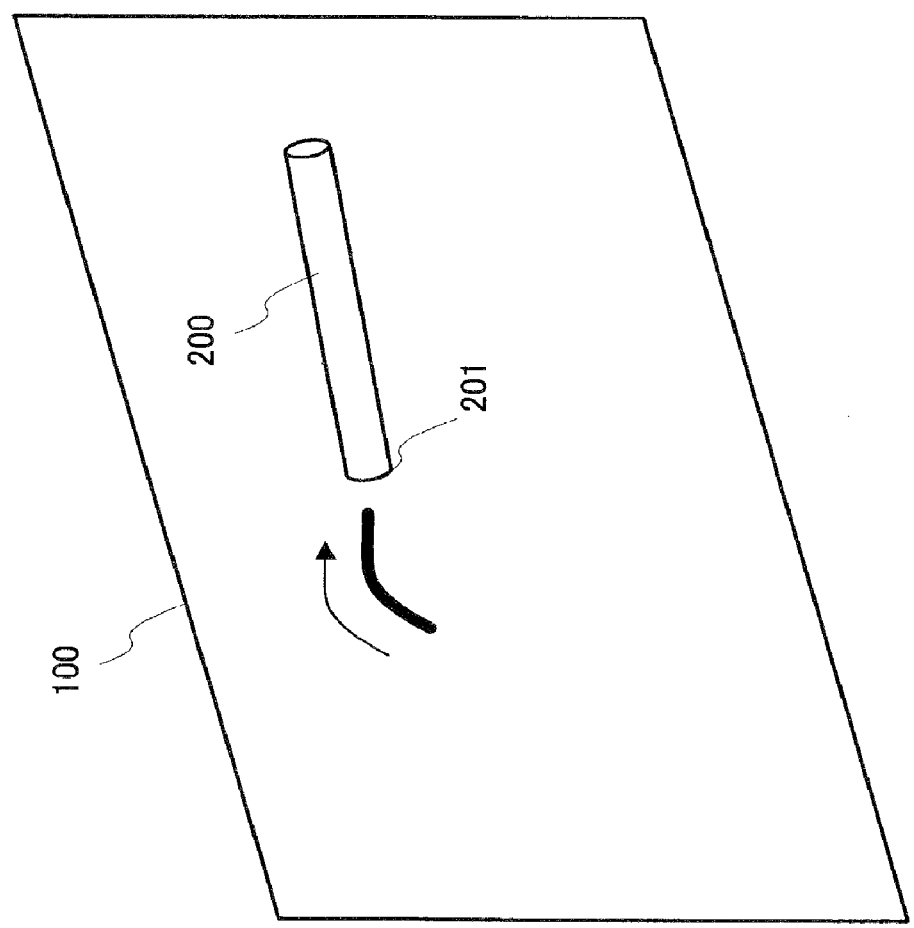
FIG. 1 is a perspective view generally showing the basic structure of a display system in an embodiment.
Figure 2:
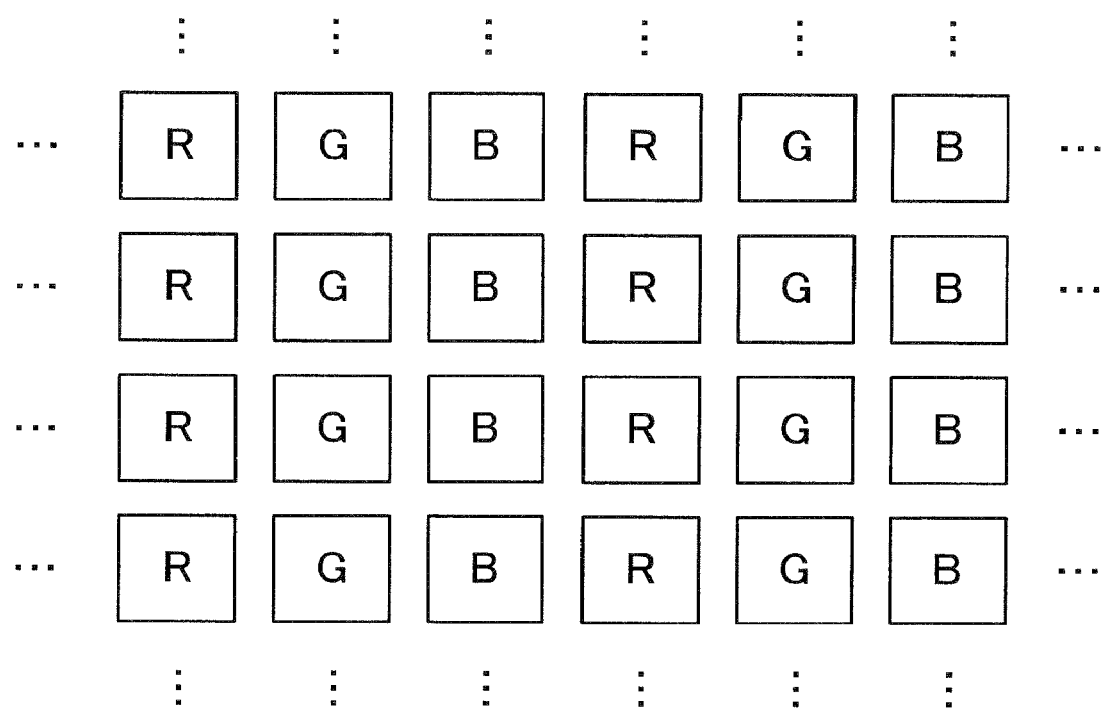
FIG. 2 is a plan view generally showing the arrangement of pixels on a display in the display system in the embodiment.
Figure 3:
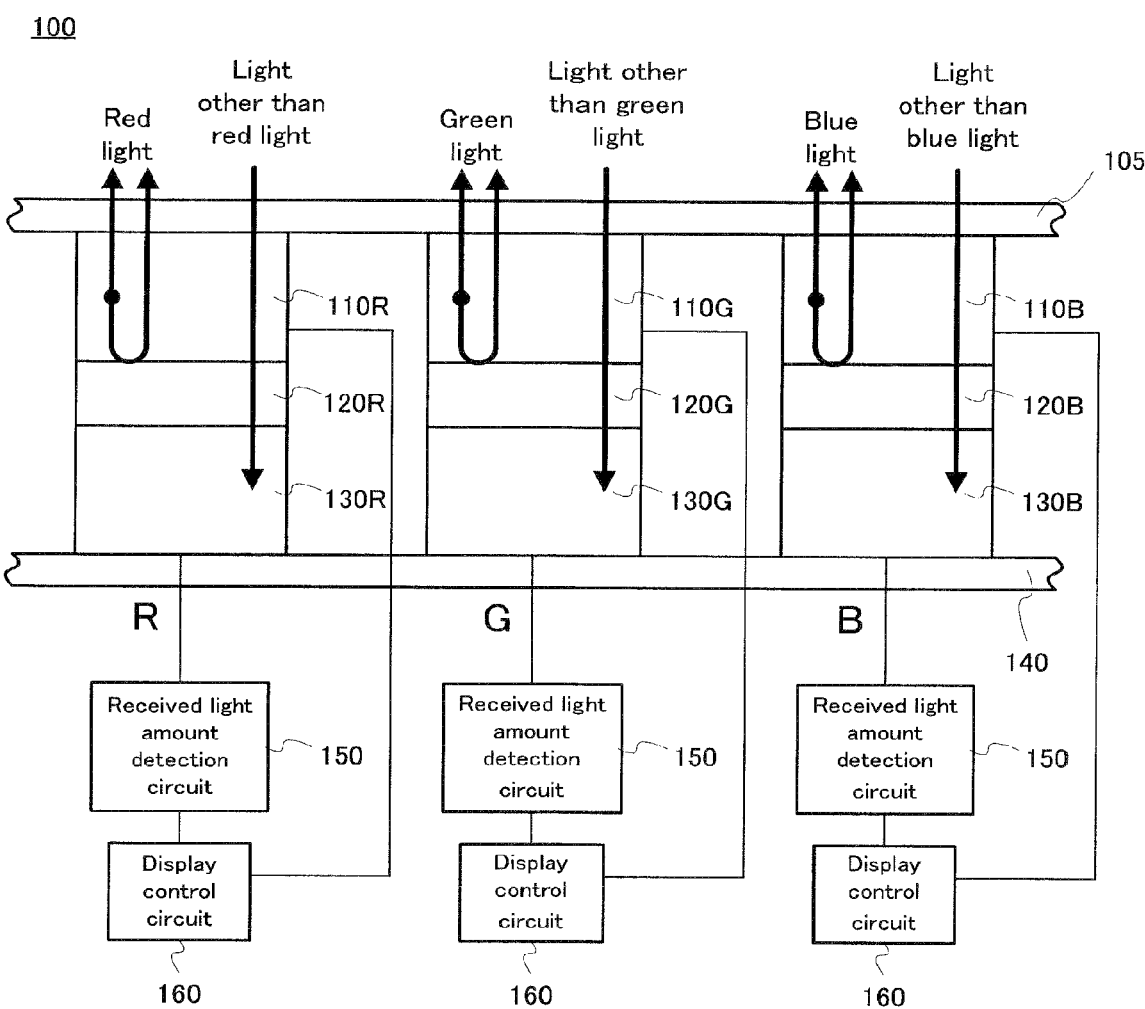
FIG. 3 is a cross sectional view generally showing the structure of pixels on the display in the display system in the embodiment.
Figure 4:
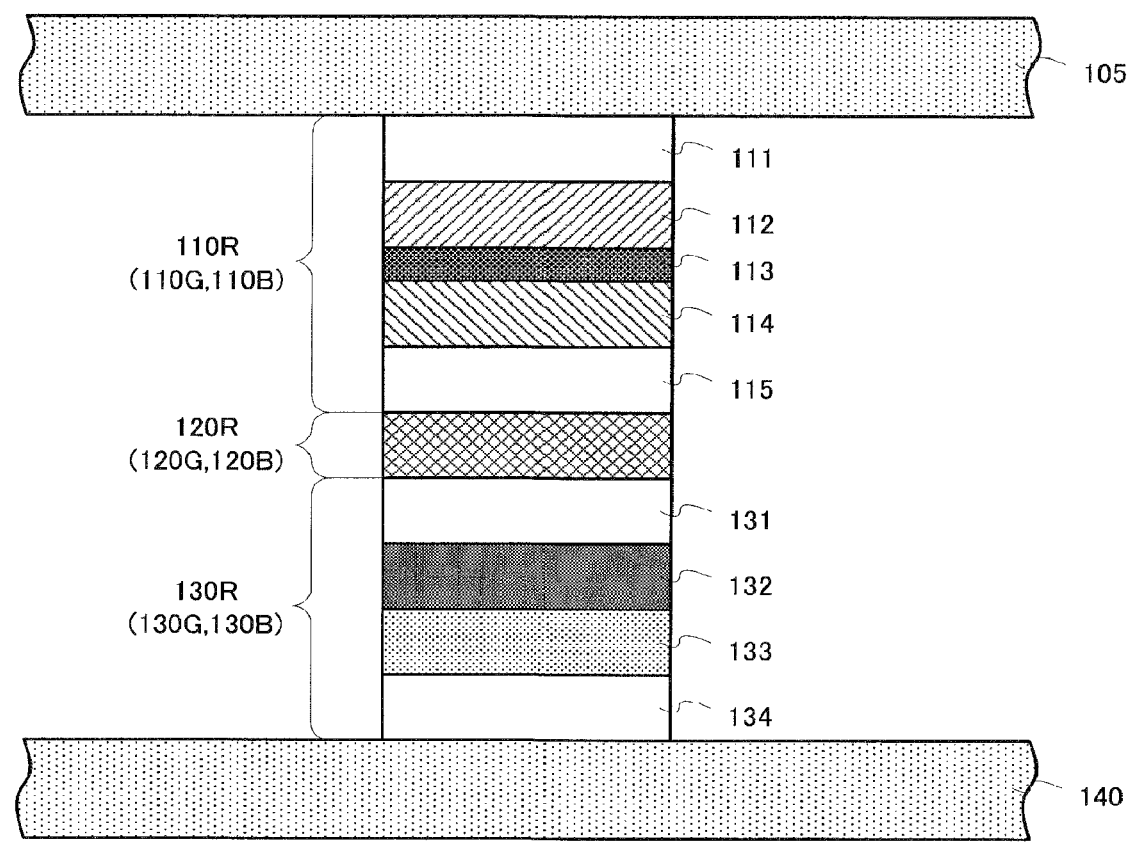
FIG. 4 is a cross sectional view showing, in details, the structure of pixels on the display in the display system in the embodiment.

Firstly, with reference to FIG. 1 to FIG. 4, the basic structure of a display system in an embodiment will be explained. FIG. 1 is a perspective view generally showing the basic structure of the display system in the embodiment. FIG. 2 is a plan view generally showing the arrangement of pixels on a display in the display system in the embodiment. FIG. 3 is a cross sectional view generally showing the structure of pixels on the display in the display system in the embodiment. FIG. 4 is a cross sectional view showing, in details, the structure of pixels on the display in the display system in the embodiment.

As shown in FIG. 1, a display system 1 in the embodiment is provided with: a display 100 for displaying a predetermined video image or the like; and a pointer 200 which is used to draw a predetermined marker or the like (e.g. a straight line, a curve, a drawing, an icon, or the like) on the display and which is equipped with a reflective film 201 on its end. A user traces or points the display surface of the display 100 with the pointer 200, and then the predetermined marker or the like is displayed on the display 100 in association with the portion traced or pointed by the user, as shown in FIG. 1.

As shown in FIG. 2, the display 100 is provided with three types (RGB) of pixels, which are arranged in a matrix. By making these three types of pixels selectively emit light in accordance with a video signal or the like inputted to the display 100, the predetermined video image or the like is displayed on the display surface of the display 100.

FIG. 3 shows a cross sectional view of the three types of pixels. As shown in FIG. 3, each pixel is disposed to be sandwiched between an upper member 105 and a lower member 140, which are formed of a transparent glass substrate or the like. The R pixel (i.e. the pixel which emits red light) is provided with: a light emitting element 110R which emits red light (specifically, light with a wave length of about 660 nm); a wavelength dependency semi-transmissive film 120R, which constitutes one specific example of the "intermediate film"; and a light receiving element 130R which receives light. The wavelength dependency semi-transmissive film 120R selectively transmits most part of light other than the red light (e.g. about 50% or more, preferably about 75% or more, and more preferably about 90% or more) and selectively reflects most part of the red light (e.g. about 50% or more, preferably about 75% or more, and more preferably about 90% or more). More specifically, the wavelength dependency semi-transmissive film 120R reflects most part of the red light which is emitted from the light emitting element 110R or which enters from the exterior of the display 100, and transmits most part of light other than the red light which enters from the exterior of the display 100.

Moreover, the G pixel (i.e. the pixel which emits green light) is provided with: a light emitting element 110G which emits green light (specifically, light with a wave length of about 520 nm); a wavelength dependency semi-transmissive film 120G, which constitutes one specific example of the "intermediate film"; and a light receiving element 130G which receives light. The wavelength dependency semi-transmissive film 120G selectively transmits most part of light other than the green light (e.g. about 50% or more, preferably about 75% or more, and more preferably about 90% or more) and selectively reflects most part of the green light (e.g. about 50% or more, preferably about 75% or more, and more preferably about 90% or more). More specifically, the wavelength dependency semi-transmissive film 120G reflects most part of the green light which is emitted from the light emitting element 110G or which enters from the exterior of the display 100, and transmits most part of light other than the green light which enters from the exterior of the display 100.

Moreover, the B pixel (i.e. the pixel which emits blue light) is provided with: a light emitting element 110B which emits blue light (specifically, light with a wave length of about 450 nm); a wavelength dependency semi-transmissive film 120B, which constitutes one specific example of the "intermediate film"; and a light receiving element 130B which receives light. The wavelength dependency semi-transmissive film 120B selectively transmits most part of light other than the blue light (e.g. about 50% or more, preferably about 75% or more, and more preferably about 90% or more) and selectively reflects most part of the blue light (e.g. about 50% or more, preferably about 75% or more, and more preferably about 90% or more). More specifically, the wavelength dependency semi-transmissive film 120B reflects most part of the blue light which is emitted from the light emitting element 110B or which enters from the exterior of the display 100, and transmits most part of light other than the blue light which enters from the exterior of the display 100.

Moreover, a received light amount detection circuit 150, which constitutes one specific example of the "monitoring device" of the present invention, is connected to each of the light receiving elements 130R, 130G, and 130B. The received light amount detection circuit 150 detects the received light amount of each of the light receiving elements 130R, 130G, and 130B, and it outputs the detected received light amount to a display control circuit 160 or the like.

Moreover, each of the light emitting elements 110R, 110G, and 110B emits light under the control of the display control circuit 160, which constitutes one specific example of the "judging device" and the "controlling device" of the present invention. The display control circuit 160 makes each of the light emitting elements 110R, 110G, and 110B selectively emit light in accordance with the video signal or the like inputted to the display 100. Moreover, the display control circuit 160 also makes each of the light emitting elements 110R, 110G, and 110B selectively emit light in accordance with the received light amount detected on the received light amount detection circuit 150. The operation will be detailed later (refer to FIG. 5 or the like).

Next, the more detailed structure of each pixel will be explained. As shown in FIG. 4, each of the light emitting elements 110R, 110G, and 110B is, for example, an organic EL element, and it is provided with: a transparent electrode 111; a hole transport layer 112; a light emitting layer 113; an electron transport layer 114; and a transparent electrode 115.

The transparent electrode 111 is an anode electrode having optical transparency, and it is, for example, an ITO (Indium Titan Oxide) electrode. Moreover, as the anode electrode, it may be an IZO (Indium Zinc Oxide) electrode instead of the ITO electrode.

The hole transport layer 112 smoothly transmits a hole (an electron hole) to the light emitting layer 113 and prevents an electron, which flows into the light emitting layer 113, from flowing into the hole transport layer 112. The hole transport layer 112 preferably includes a material (in particular, an organic material) with a relatively large hole mobility.

The light emitting layer 113 actually emits light. More specifically, a voltage is applied between the transparent electrodes 111 and 115, by which the hole which flows from the hole transport layer 112 combines with the electron which flows from the electron transport layer 114. This causes a change in en electron energy state in the light emitting layer 113, to thereby emit light. The light emitting layer 113 preferably includes a material (in particular, an organic material)

with a high luminous efficiency (or quantum efficiency) and a high transport property of transporting a carrier (i.e. a hole and an electron). The light emitting layer 113 also preferably includes a preferable material (in particular, an organic material) in accordance with which color of the light is emitted.

The electron transport layer 114 smoothly transmits an electron to the light emitting layer 113 and prevents a hole, which flows into the light emitting layer 113, from flowing into the electron transport layer 114. The electron transport layer 114 preferably includes a material (in particular, an organic material) with a relatively large electron mobility.

The transparent electrode 115 is a cathode electrode having optical transparency, and it is, for example, an ITO (Indium Titan Oxide) electrode. Moreover, as the anode electrode, it may be an IZO (Indium Zinc Oxide) electrode instead of the ITO electrode.

Incidentally, there may be further provided a hole injection layer including e.g. CuPc (copper phthalocyanine) between the transparent electrode 111 and the hole transport layer 112. Alternatively, there may be further provided an electron injection layer including e.g. LiF (lithium fluoride) between the electron transport layer 114 and the transparent electrode 115.

Moreover, each of the light receiving elements 130R, 130G, and 130B is provided with: a transparent electrode 131; a photoelectric conversion layer 132 including an organic material; an electron transport layer 133 including an organic material; and a sensor electrode 134.

If the photoelectric conversion layer 132 is irradiated with light in a predetermined energy or more, the light energy is absorbed into the photoelectric conversion layer 132, and one portion of valence electrons within the photoelectric conversion layer 132 jumps a forbidden band over an energy band to become a conduction electron, while a hole is generated in the valence electron band. The conduction electron flows between the transparent electrodes 131 and 134 through the electron transport layer 133, to thereby generate a voltage between the transparent electrodes 131 and 134. By measuring this voltage, the received light amount of the light received on the light receiving elements 130R, 130G, and 130B is measured.

(2) Aspect of Operation

Figure 5:
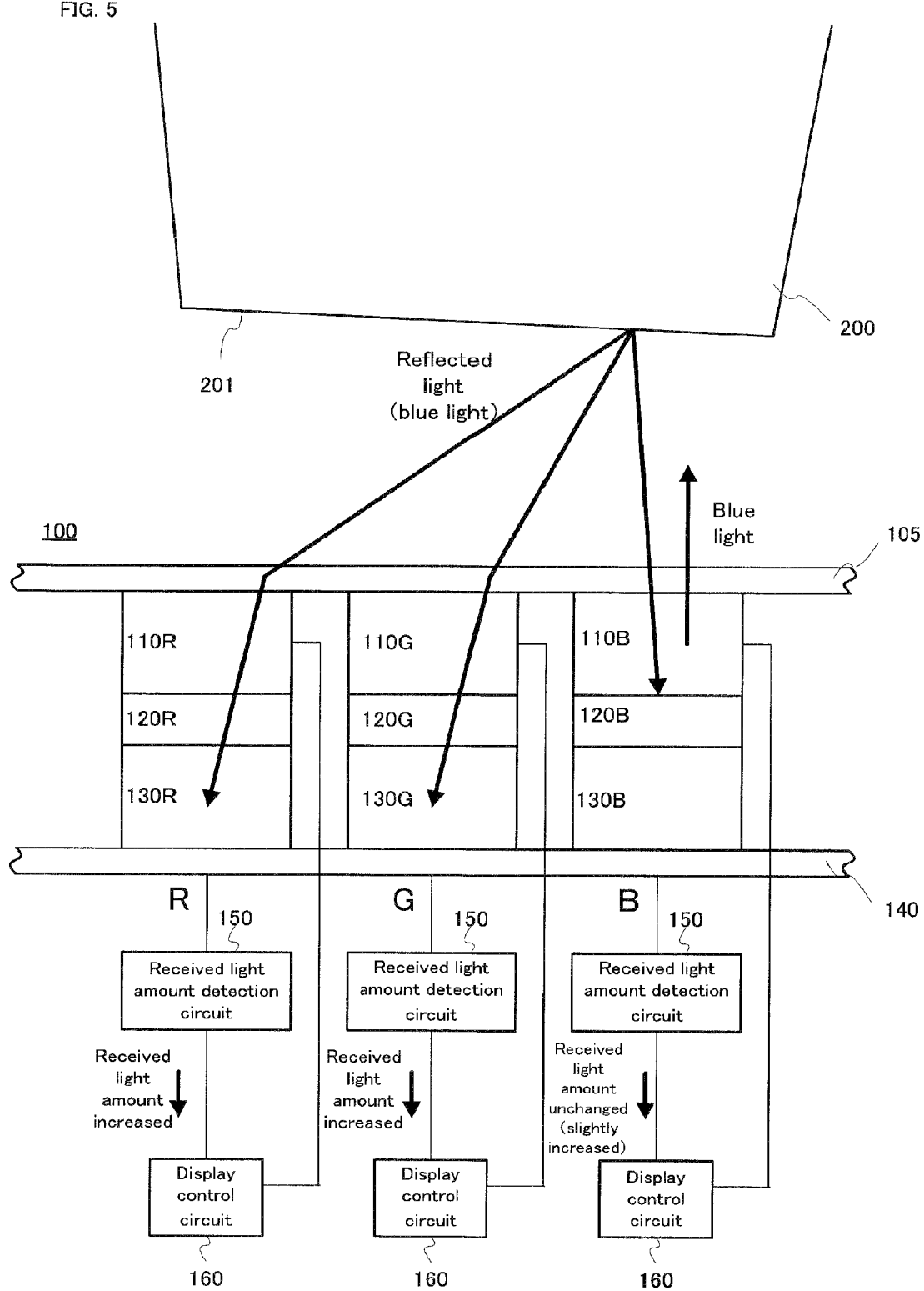
FIG. 5 is a cross sectional view generally showing one aspect of the display system in the embodiment.
Figure 6:
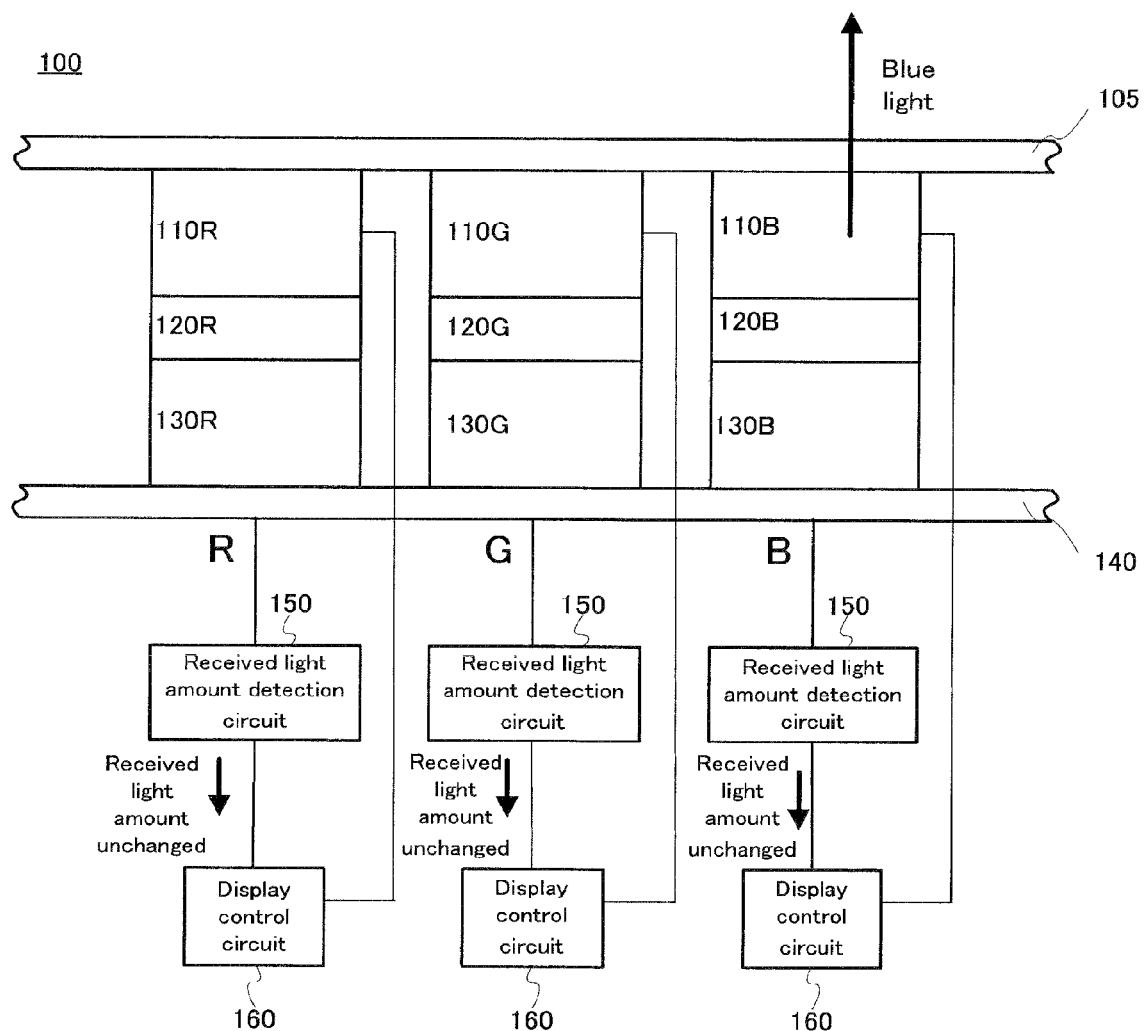
FIG. 6 is a cross sectional view generally showing another aspect of the display system in the embodiment.

Next, with reference to FIG. 5 and FIG. 6, an aspect of the operation of the display system 1 will be explained. FIG. 5 is a cross sectional view generally showing one aspect of the display system in the embodiment. FIG. 6 is a cross sectional view generally showing another aspect of the display system in the embodiment. Incidentally, to simplify the explanation, the blue light emitted from the light emitting element 110B will be focused and explained below.

As shown in FIG. 5, if a user traces or points the surface of the display with the pointer 200, the blue light emitted from the light emitting element 110B is reflected on the reflective film 201 formed in an end portion of the pointer 200. The blue light reflected on the reflective film 201 enters the light emitting element 110B and the other light emitting elements 110R and 110G adjacent to the light receiving element 110B (and further not-illustrated other light emitting elements 110R, 110G, and 110B).

At this time, most part of the blue light which enters the light receiving element 110B cannot be transmitted through the wavelength dependency semi-transmissive film 120B. That is, most part of the blue light which enters the light receiving element 110B is reflected on the wavelength dependency semi-transmissive film 120B. Thus, most part of the blue light which enters the light receiving element 110B is not received on the light receiving element 130B, and a small portion of the blue light which enters the light receiving element 110B is received on the light receiving element 130B. As a result, the received light amount on the light receiving element 130B is slightly increased or unchanged, compared with the received light amount before the display surface of the display 100 is traced or pointed with the pointer 200.

In contrast, the blue light which enters the other light emitting elements 110R and 110G adjacent to the light emitting element 110B can be transmitted through the wavelength dependency semi-transmissive films 120R and 120G, so that it is received on the light receiving elements 130R and 130G. This increases the received light amount on the light receiving elements 130R and 130G, compared with the received light amount before the display surface of the display 100 is traced or pointed with the pointer 200.

Such a change in the received light amount is detected on the received light amount detection circuits 150 each of which is respectively connected to each of the light receiving elements 130R, 130G, and 130B. Therefore, if the received light amount detected on the received light amount detection circuit 150 is increased (or is equal to or greater than a predetermined threshold value), it is possible to recognize that the user uses the pointer 200 and traces or points the pixel including at least light receiving element 130 in which the received light amount is increased (or the received light amount is equal to or greater than the predetermined threshold value). At this time, it is preferable to compare the received light amount on the basis of the received light amount (or by using the received light amount as the threshold value) of the light receiving elements 130R, 130G, and 130B in the case where the reflected light from the pointer 200 is not received (or the received light amount of the light receiving elements 130R, 130G, and 130B in the case where the reflected light from the pointer 200 is not received, when light is emitted from each of the light emitting elements 110R, 110G, and 110B). After that, in accordance with the portion traced or pointed by the user with the pointer 200, the display control circuit 160 controls each of the light emitting elements 110R, 110G, and 110B so as to make the corresponding light emitting elements 110R, 110G, and 110B emit light. By this, the predetermined marker or the like is displayed on the display 100 in association with the portion traced or pointed by the user with the pointer 200. More specifically, for example, in order to display the portion traced or pointed by the user as a black line, the light emitting elements 110R and 110G, which correspond to the light receiving elements 130R and 130G in which the received light amount is increased, are controlled to emit light and the light emitting element 110G, which constitutes a group of pixel unit with such light emitting elements 110R and 110G, which correspond to the light receiving elements 130R and 130G in which the received light amount is increased, (i.e. a pixel unit including one R pixel, one G pixel, and one B pixel, which are adjacent to each other), is controlled to emit light, to thereby display the black line on the display 100.

On the other hand, as shown in FIG. 6, if the user does not trace or point the surface of the display with the pointer 200, the blue light emitted from the light emitting element 110B is propagated toward the exterior as it is. As a result, the received light amount of each of the light receiving elements 130R, 130G, and 130B is unchanged. Therefore, the video image based on the video signal or the like inputted to the display 100 is displayed on the display 100, and the predetermined marker or the like is not displayed.

As explained above, by monitoring the received light amount of each of the light receiving elements 130R, 130G, and 130B, it is possible to recognize which portion of the display surface of the display 100 the user traces or points with the pointer 200. By this, a predetermined shape of marker or the like can be displayed in association with the portion traced or pointed by the user with the pointer 200.

In addition, each of the light emitting elements 110R, 110G, and 110B is disposed on the outermost side of the display 100. Therefore, it is possible to propagate the light toward the exterior from each of the light emitting elements 110R, 110G, and 110B without unnecessary constituent elements intervening. Thus, it is possible to efficiently propagate the light emitted from each of the light emitting elements 110R, 110G, and 110B, toward to the exterior of the display 100.

Moreover, it is possible to propagate the light toward the exterior by reflecting the light emitted from each of the light emitting elements 110R, 110G, and 110B toward the inside of the display 100, on each of the wavelength dependency semi-transmissive films 120R, 120G, and 120B. By this, it is possible to propagate the light emitted from the light emitting elements 110R, 110G, and 110B, toward the exterior of the display 100 without more waste.

Moreover, the wavelength of the light received on each of the light receiving elements 130R, 130G, and 130B is determined by respective one of the wavelength dependency semi-transmissive films 120R, 120G, and 120B. Therefore, on the basis of the combination of the light receiving elements 130R, 130G, and 130B in which the received light amount is increased, it is possible to recognize which color of light (or which wavelength of light) is received. Therefore, for example, in accordance with which color of light (or which wavelength of light) is received, it is also possible to select the color of the marker or the like displayed on the display 100. For example, if the received light amount of the light receiving elements 130R and 130G is increased, compared with a predetermined reference value (or equal to or greater than a predetermined threshold value), and if the received light amount of the light receiving element 130B is not increased compared with the predetermined reference value (or equal to or less than the predetermined threshold value), it is possible to recognize that the receiving light is the blue light. On the basis of this, it is also possible to display the marker or the like in blue on the display 100.

(3) Pointer

Figure 7:
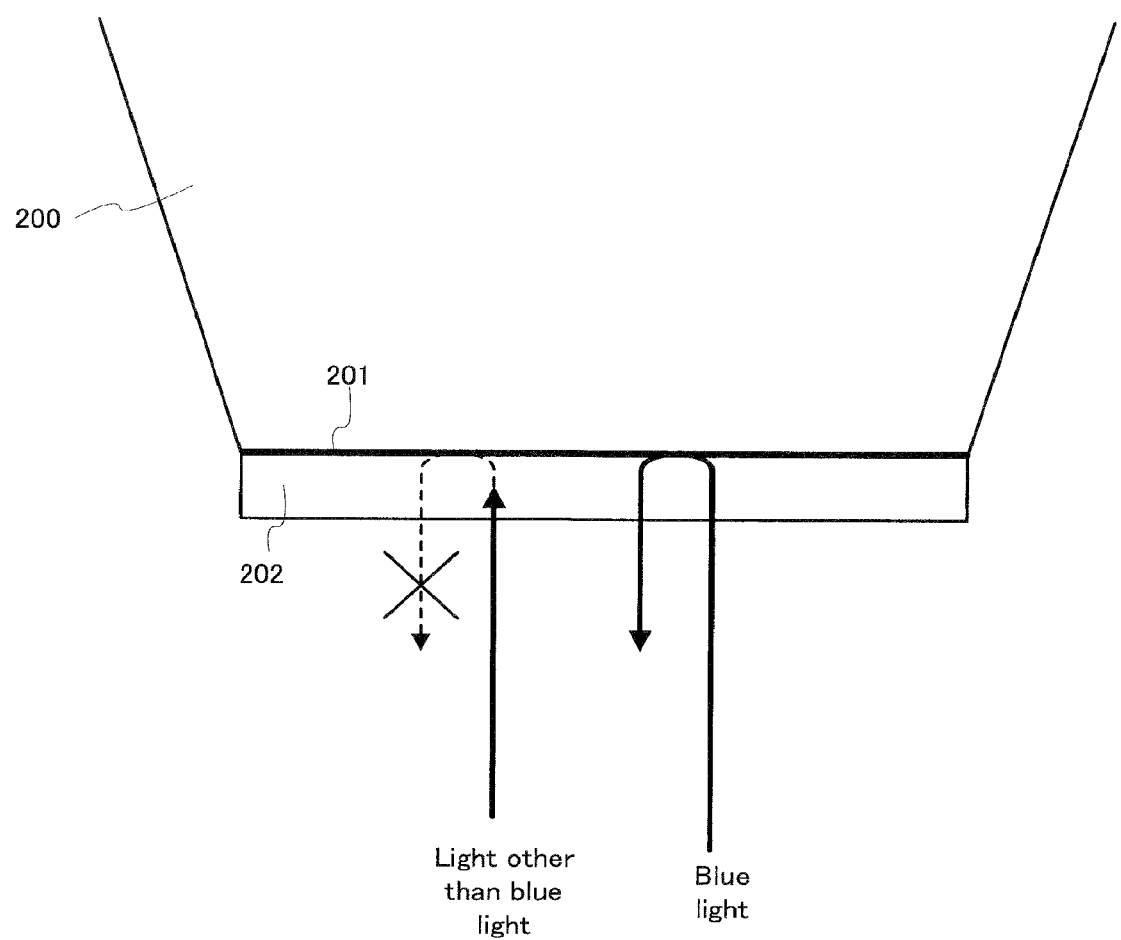
FIG. 7 is a cross sectional view generally showing more specific one structure of a pointer used in the display system in the embodiment.
Figure 9:
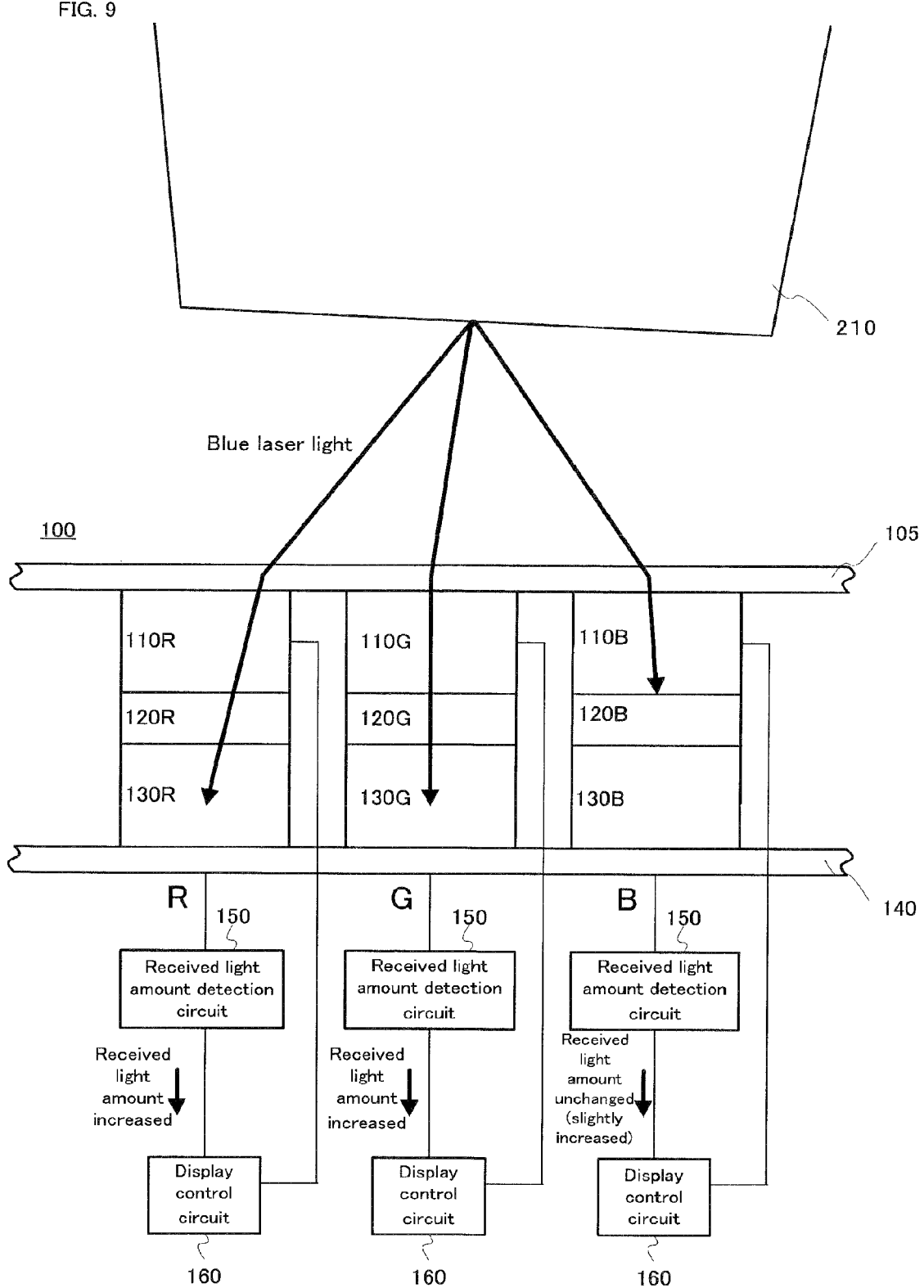
FIG. 9 is a cross sectional view generally showing an aspect of the operation of the display system in the embodiment if the pointer which employs another structure is used.

Next, with reference to FIG. 7 to FIG. 9, the more specific structure of the pointer 200 will be explained. FIG. 7 is a cross sectional view generally showing more specific one structure of the pointer 200 used in the display system 1 in the embodiment. FIG. 8 are cross sectional views generally showing more specific other structures of the pointer 200 used in the display system 1 in the embodiment. FIG. 9 is a cross sectional view generally showing an aspect of the operation of the display system 1 in the embodiment if the pointer which employs another structure is used.

As shown in FIG. 7, a wavelength selection filter 202 may be disposed on the surface of the reflective film 201. The wavelength selection filter 202 selectively transmits light with a predetermined wavelength while it selectively attenuates, scatters, or absorbs light with a wavelength other than the predetermined wavelength. As a result, on the reflective film 201 disposed on the end of the pointer 200, the light with the predetermined wavelength is selectively reflected, and the light with the wavelength other than the predetermined wavelength is not reflected. By this, it is possible to determine the wavelength (i.e. color) of the light received on at least one of the light receiving elements 130R, 130G, and 130B. This allows the same operation as that a predetermined portion on the display surface of the display 100 is traced or pointed by using the laser pointer which irradiates laser light with the predetermined wavelength (i.e. color).

Moreover, it is also possible to change an angle of the reflective film 201, formed on the end of the pointer 200, with respect to the end of the pointer 200 (in other words, an angle with respect to the optical path or the display surface of the display 100). Specifically, as shown in FIG. 8(a), in a first state, the reflective film 201 may be able to reflect the light. On the other hand, as shown in FIG. 8(b), in a second state, the reflective film 201 may not be able to reflect the light. Then, in order to switch between the first state and the second state, for example, as shown in FIG. 8(c), a button 203 that the user presses to change between the first state and the second state is disposed on the side surface of the pointer 200.

Thus, by the user pressing the button 203, the angle of the reflective film 201 is changed, and the pointer 200 can reflect or not reflect the light. Therefore, if the user does not want to display the marker or the like in accordance with the track of the pointer 200, it is possible to prevent such a disadvantage that the marker or the like is unnecessarily or unexpectedly displayed even if the pointer 200 traces or points the display surface of the display 100, by switching to the second state shown in FIG. 8(b).

Moreover, by switching between the first state and the second state, as occasion demands, the incidence of light to the light receiving elements 130R, 130G, and 130B can be made on and off. If such on-and-off incidence of light is designed as a "selection" command corresponding to a mouse click, an icon or the like displayed on the display surface of the display 100 may be selected to perform an operation according to the selected icon.

Moreover, instead of the pointer 200 provided with the reflective film 201 on the end, it is also possible to use a pointer 210 which can emit laser light or the like with a predetermined wavelength (i.e. in a predetermined color), as shown in FIG. 9. In the example shown in FIG. 9, the pointer 210, which emits blue laser light (i.e. laser light with a wavelength of about 450 nm), is used. As in the case shown in FIG. 5, the received light amount of each of the light receiving elements 130R and 130G is increased, and the received light amount of the light receiving element 130B is slightly increased or unchanged. Thus, it is possible to recognize that the user traces or points the display surface of the display 100 in the pixel including the light receiving elements 130R and 130G in which at least the received light amount is increased with the pointer 210. Moreover, it is also possible to recognize that the user traces or points the display surface of the display 100 with the blue light laser.

Incidentally, if the pointer 210 which can emit the laser light or the like is used, it is possible to receive such an advantage that the user can trace or point the desired portion even from a point away to some extent from the display surface of the display 100.

(4) Modified Examples

Figure 10:
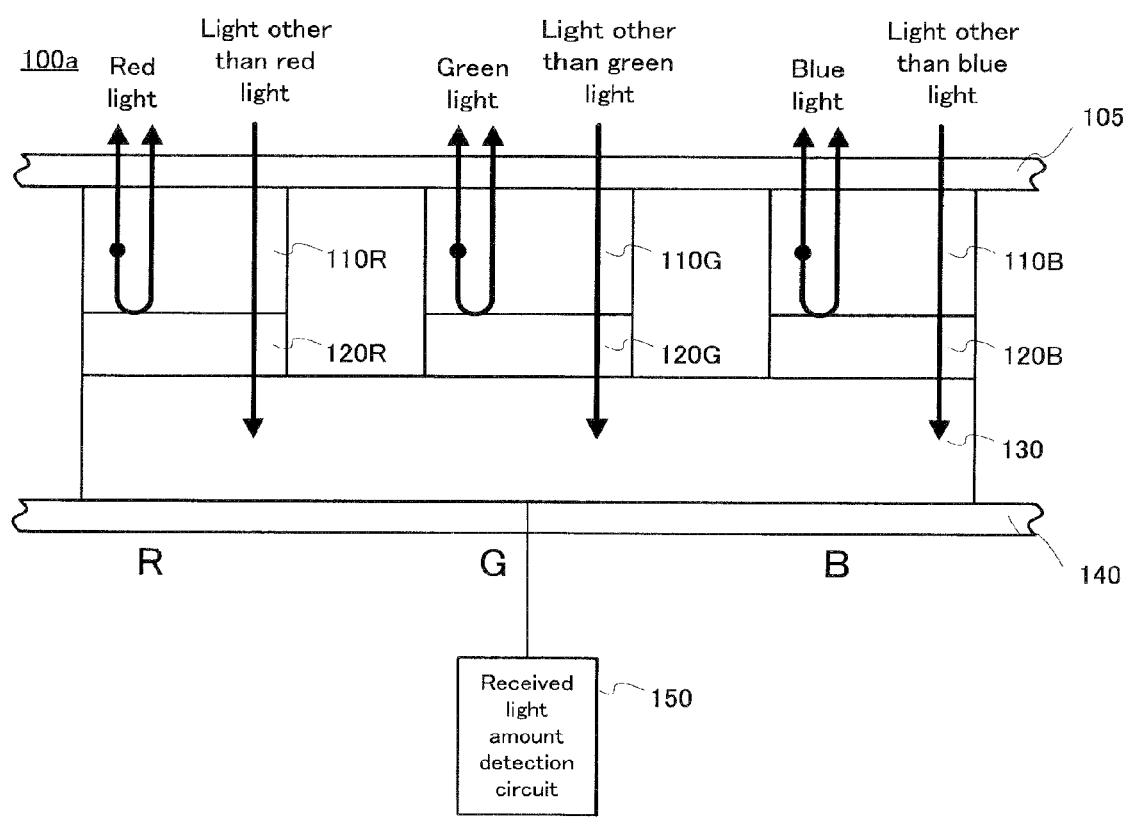
FIG. 10 is a cross sectional view generally showing a first modified example of the display system in the embodiment.
Figure 11:
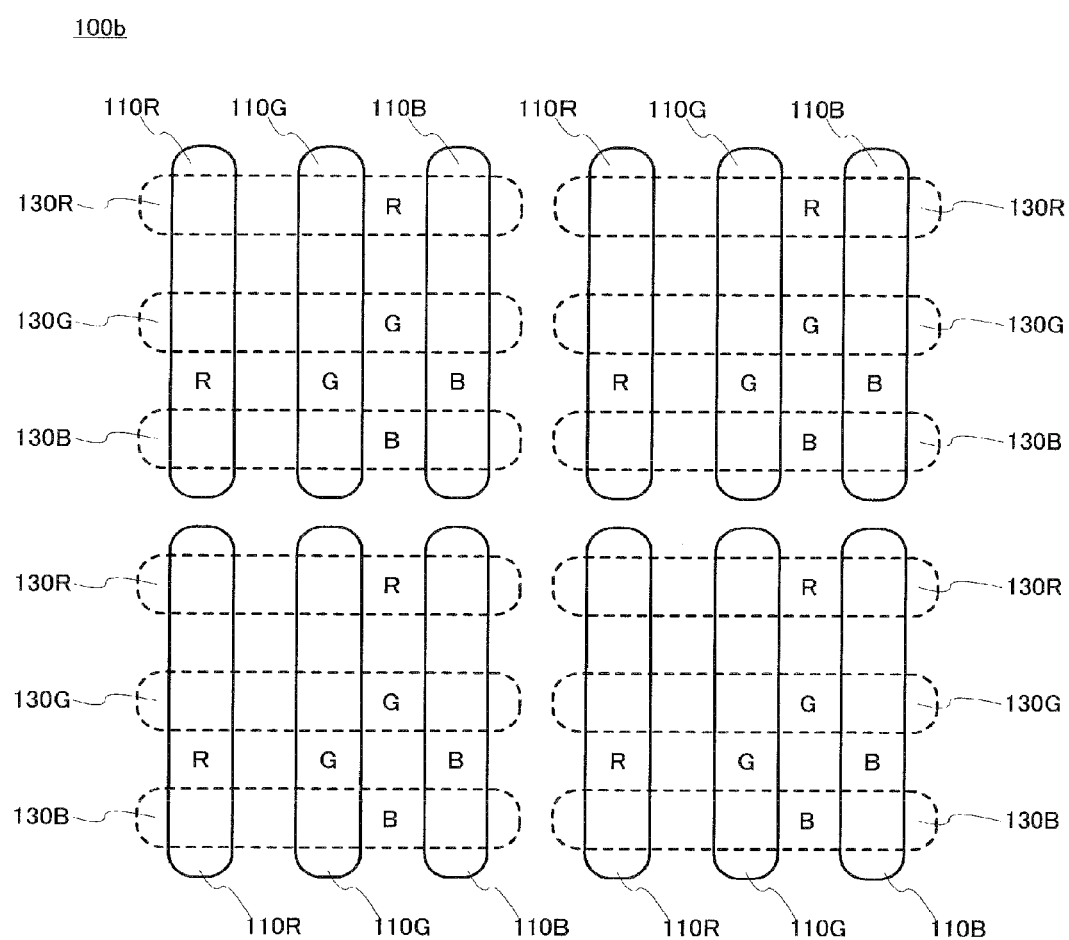
FIG. 11 is a cross sectional view generally showing a second modified example of the display system in the embodiment.
Figure 12:
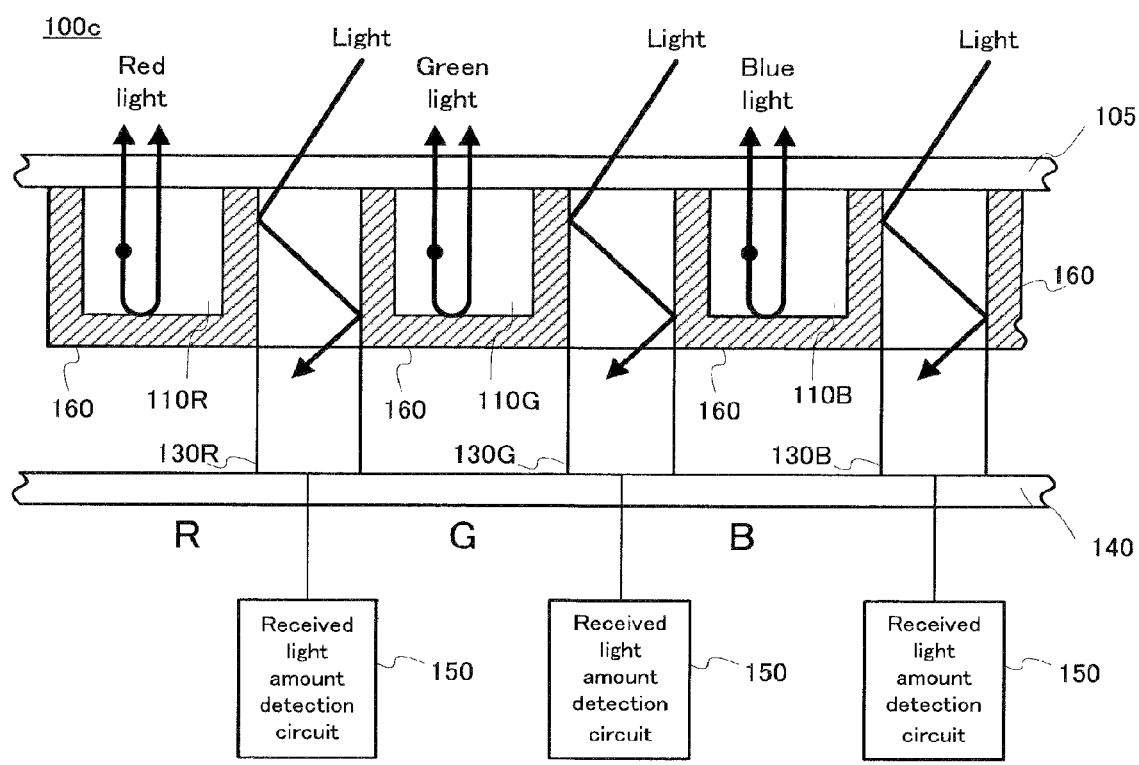
FIG. 12 is a cross sectional view generally showing a third modified example of the display system in the embodiment.
Figure 13:
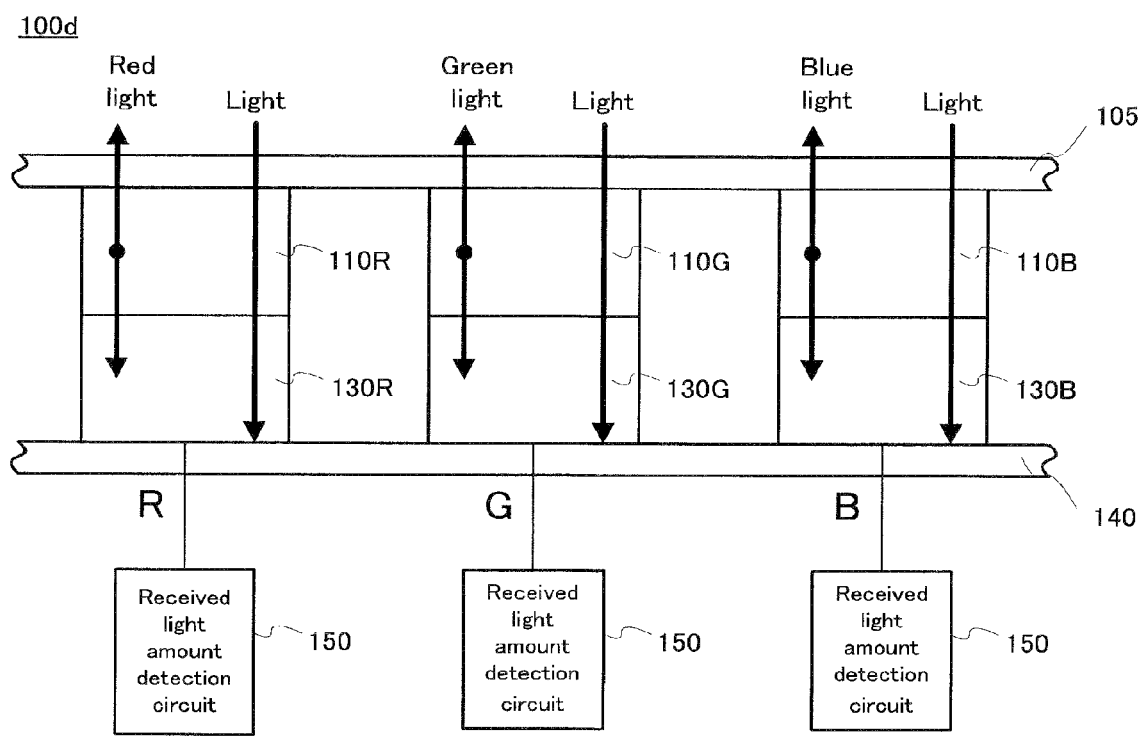
FIG. 13 is a cross sectional view generally showing a fourth modified example of the display system in the embodiment.
Figure 14:
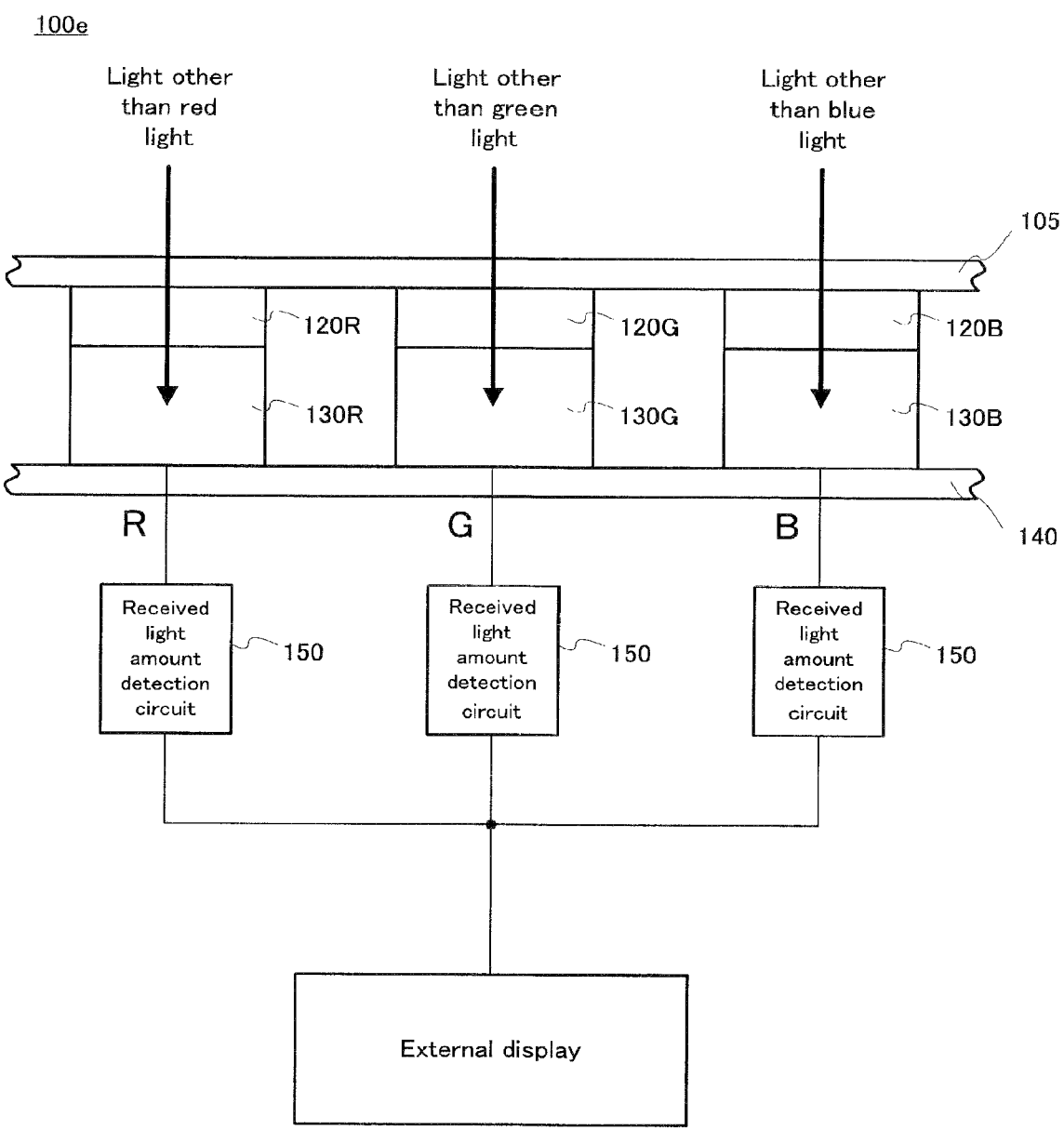
FIG. 14 is a cross sectional view generally showing a fifth modified example of the display system in the embodiment.

Next, with reference to FIG. 10 to FIG. 14, an explanation will be given on modified examples of the display system 1 in the embodiment. FIG. 10 is a cross sectional view generally showing a first modified example of the display system 1 in the embodiment. FIG. 11 is a cross sectional view generally showing a second modified example of the display system 1 in the embodiment. FIG. 12 is a cross sectional view generally showing a third modified example of the display system 1 in the embodiment. FIG. 13 is a cross sectional view generally showing a fourth modified example of the display system 1 in the embodiment. FIG. 14 is a cross sectional view generally showing a fifth modified example of the display system 1 in the embodiment. Incidentally, in the following explanation of the modified examples, in order to simplify explanation, one portion of the constituent elements of the display system 1 (or the display 100 which constitutes the display system 1) is selectively extracted and explained.

As shown in FIG. 10, one common light receiving element 130 may be provided in the pixel unit which is formed of one light emitting element 110R, one light emitting element 110G, and one light emitting element 110B. Even in such construction, the increase in the received light amount can be detected. Thus, it is possible to preferably recognize which pixel portion of the display surface of the display 100 the light reflected on the reflective film 201 of the pointer 200 enters (i.e. which portion of the display surface of the display 100 the pointer 200 traces or points).

Alternatively, in view of a spot radius or the like, on the display surface of the display 100, of the light reflected on the reflective film 201, one common light receiving element may be provided in each of the plurality of pixels distributed within a range of the spot radius. More specifically, if the spot radius of the light reflected on the reflective film is distributed in a range including nine pixels (e.g. three R pixels, three G pixels, and B pixels), one common light receiving element 130 may be provided for the nine pixels (or nine or less pixels).

As shown in FIG. 11, the longitudinal direction of the light emitting elements 110R, 110G, and 110B and the longitudinal direction of the light receiving elements 130R, 130G, and 130B may cross at about 90 degrees. In other words, the longitudinal direction of the light emitting elements 110R, 110G, and 110B and the longitudinal direction of the light receiving elements 130R, 130G, and 130B may have a shift of about 90 degrees.

As shown in FIG. 12, the light emitting element 110R and the light receiving element 130R may not overlap in a normal direction of the display 100 (i.e. on the optical path of the light which enters almost perpendicularly to the display surface of the display 100). Moreover, the light emitting element 110G and the light receiving element 130G, and further the light emitting element 110B and the light receiving element 130B may not overlap in the normal direction of the display 100. In other words, each of the light receiving elements 130R, 130G, and 130B may receive light from each gap between the light emitting elements 110R, 110G, and 110B. At this time, a reflective film 160 including aluminum or the like is formed in the surroundings other than a surface on the display surface side of the display 100 in each of the light emitting elements 110R, 110G, and 110B.

The light emitted from each of the light emitting elements 110R, 110G, and 110B is reflected by the reflective film 160, by which almost all of the reflected light is propagated toward the exterior of the display 100. Therefore, it is possible to efficiently propagate the light emitted from each of the light emitting elements 110R, 110G, and 110B toward the exterior of the display 100.

Moreover, even if the reflective film 160 is formed, since each of the light receiving elements 130R, 130G, and 130B does not overlap respective one of the light emitting elements 110R, 110G, and 110G in the normal direction of the display 100, the light preferably enters from the exterior without an influence of the reflective film 160. Then, the reflective film 160 formed particularly on the side surface of each of the light emitting elements 110R, 110G, and 110B can be an optical path which leads the light which enters the display 100, to respective one of the light receiving elements 130R, 130G, and 130B. Therefore, it is possible to efficiently propagate the light reflected on the reflective film 201, which is disposed on the end of the pointer 200, to the light receiving elements 130R, 130G, and 130.

As shown in FIG. 13, the aforementioned wavelength dependency semi-transmissive films 120R, 120G, and 120B may not be provided. Even in such construction, the received light amount of the light receiving elements 130R, 130G, and 130B is increased if the light reflected on the reflective film 201, which is disposed on the end of the pointer 200, enters the light receiving elements. Thus, as described above, it is possible to recognize the portion traced or pointed by the user with the pointer 200. Then, since the wavelength dependency semi-transmissive films 120R, 120G, and 120B are not provided, the structure of the display 100 can be relatively simplified, and the display 100 can be further thinned.

Moreover, even the light emitted from each of the light emitting elements 110R, 110G, and 110B propagates toward the exterior of the display 100 to some extent. Thus, there is no such a problem that the normal video image, the marker or the like can be hardly displayed. However, from the view point of the more preferable display of the video image, the marker or the like, the structure shown in FIG. 13 is preferably employed in the case where each of the light emitting elements 110R, 110G, and 110B has a relatively high light emitting efficiency. If each of the light emitting elements 110R, 110G, and 110B has a relatively low light emitting efficiency, it is preferable to provide the aforementioned wavelength dependency semi-transmissive films 120R, 120G, and 120B.

As shown in FIG. 14, only the wavelength dependency semi-transmissive films 120R, 120G, and 120B and the light receiving elements 130R, 130G, and 130B may be provided, and the light emitting elements 110R, 110G, and 110B may not be provided. In this case, instead of the light emitting elements 110R, 110G, and 110B, for example, an external display may be used to display the marker or the like in a predetermined shape in association with the portion traced or pointed by the user with the pointer 200. By this, an operation like tablet can be realized.

The present invention is not limited to the aforementioned embodiments, and various changes may be made, if desired, without departing from the essence or spirit of the invention which can be read from the claims and the entire specification. A display apparatus, which involves such changes, is also intended to be within the technical scope of the present invention.

INDUSTRIAL APPLICABILITY

The display apparatus according to the present invention can be applied to equipment for displaying a location specified by a user with a pointer or the like on a display surface, and particularly to a display apparatus, such as a display, including the equipment.

The invention claimed is:

1. A display apparatus comprising:
 a plurality of intermediate films, each of which reflects light including at least a corresponding light component with a predetermined wavelength from incoming light;
 a plurality of light receiving elements, each of which receives the incoming light through a respective one of said plurality of intermediate films; and a plurality of light emitting elements, each of which emits light, said plurality of intermediate films being disposed between said plurality of light emitting elements and said plurality of light receiving elements, each of said plurality of intermediate films is disposed to make a pair with a respective one of said plurality of light emitting elements, each of said plurality of intermediate films reflects light emitted from said paired light emitting element and transmits a light component with a wavelength other than a wavelength of the light emitted from said paired light emitting element.

2. The display apparatus according to claim 1, wherein said light receiving element includes an organic light receiving element.

3. The display apparatus according to claim 1, wherein one of said plurality of light emitting elements, one of said plurality of light receiving elements which makes a pair with the one light emitting element, and one of said plurality of intermediate films which makes a pair with the one light emitting element are laminated along an optical path of the incoming light.

4. The display apparatus according to claim 1, wherein one of said plurality of light emitting elements is disposed at a different position from that of one of said plurality of light receiving elements corresponding to the one light emitting element, along with an optical path of the incoming light.

5. The display apparatus according to claim 4, wherein a reflective film which reflects about 100% of incoming light is formed in the surroundings of the one light emitting element.

6. The display apparatus according to claim 1, wherein each of said plurality of light receiving elements corresponds to said plurality of light emitting elements in a ratio of 1:L (L is an integer of 1 or more).

7. The display apparatus according to claim 1, wherein said light emitting elements include organic EL (Electro Luminescence) elements.

8. The display apparatus according to claim 1, wherein said light emitting elements include inorganic EL elements.

9. The display apparatus according to claim 1, further comprising a pointer provided with a reflective film which reflects light emitted from at least one of said plurality of light emitting elements, at a position away from each of said light emitting elements and said light receiving elements.

10. The display apparatus according to claim 9, wherein the reflective film selectively reflects a light component with a predetermined wavelength from among the light emitted from at least one of said plurality of light emitting elements.

11. The display apparatus according to claim 9, wherein a semi-transmissive film, which selectively transmits a light component with a predetermined wavelength from the light emitted from at least one of said plurality of light emitting elements, is formed on the reflective film.

12. The display apparatus according to claim 9, wherein said pointer switches between a first state and a second state, the light emitted from at least one of said plurality of light emitting elements being reflected to said light receiving element in the first state, the light emitted from at least one of said plurality of light emitting elements being not reflected to said light receiving element in the second state, and said pointer further comprises a switching device for switching between the first state and the second state.

13. The display apparatus according to claim 12, wherein said pointer switches between the first state and the second state by changing an angle of a reflective surface of the reflective film with respect to said pointer.

14. The display apparatus according to claim 1, further comprising:

a monitoring device for monitoring a received light amount of each of said plurality of light receiving elements;

a judging device for judging whether or not the received light amount of at least one of said plurality of light receiving elements is equal to or greater than a predetermined threshold value; and a controlling device for controlling each of said plurality of light emitting elements to emit light from at least one of said plurality of light emitting elements, which corresponds to the at least one light receiving element in a ratio of 1:M (M is an integer of 1 or more), if it is judged that the received light amount of the at least one light receiving element exceeds the threshold value.

15. The display apparatus according to claim 1, further comprising:

a monitoring device for monitoring a received light amount of each of said plurality of light receiving elements;

a judging device for judging whether or not the received light amount of at least one of said plurality of light receiving elements is equal to or greater than a predetermined threshold value; and a controlling device for controlling a light emitting device which is disposed in the exterior of said display apparatus and which comprises a plurality of light emitting elements for emitting light to emit light from at least one of said plurality of light emitting elements, which corresponds to the at least one light receiving element in a ratio of 1:N (N is an integer of 1or more), if it is judged that the received light amount of the at least one light receiving element exceeds the threshold value.

16. A display apparatus comprising:

a plurality of light emitting elements, each of which emits light; and a plurality of light receiving elements, each of which receives incoming light from the light emitting elements; and a plurality of intermediate films, said plurality of intermediate films being disposed between said plurality of light emitting elements and said plurality of light receiving elements, one of said plurality of light emitting elements being disposed at a different position from a position of one of said plurality of light receiving elements corresponding to the one of said plurality of light emitting element, along with an optical path of the incoming light, each of said plurality of intermediate films is disposed to make a pair with a respective one of said plurality of light emitting elements, each of said plurality of intermediate films reflects light emitted from said paired light emitting element and transmits a light component with a wavelength other than a wavelength of the light emitted from said paired light emitting element.

* * * * *